(12) United States Patent
Li et al.

(10) Patent No.: US 11,530,054 B2
(45) Date of Patent: Dec. 20, 2022

(54) SPACECRAFT NUTATION INHIBITION METHOD FOR LOW-ORBIT GEOMAGNETIC ENERGY STORAGE IN-ORBIT DELIVERY

(71) Applicants: INSTITUTE OF MECHANICS, CHINESE ACADEMY OF SCIENCES, Beijing (CN); GUANGDONG ACADEMY OF AEROSPACE RESEARCH IMECH, CAS, Guangzhou (CN)

(72) Inventors: Wenhao Li, Beijing (CN); Heng Zhang, Beijing (CN); Guanhua Feng, Beijing (CN); Chen Zhang, Beijing (CN); Lei Yang, Beijing (CN); Linli Lv, Beijing (CN)

(73) Assignees: INSTITUTE OF MECHANICS, CHINESE ACADEMY OF SCIENCES, Beijing (CN); GUANGDONG ACADEMY OF AEROSPACE RESEARCH IMECH, CAS, Guangzhou (CN)

(*) Notice: Subject to any disclaimer, the term of this patent is extended or adjusted under 35 U.S.C. 154(b) by 0 days.

(21) Appl. No.: 17/638,870

(22) PCT Filed: Jun. 23, 2020

(86) PCT No.: PCT/CN2020/097729
§ 371 (c)(1),
(2) Date: Feb. 28, 2022

(87) PCT Pub. No.: WO2021/068554
PCT Pub. Date: Apr. 15, 2021

(65) Prior Publication Data
US 2022/0306323 A1 Sep. 29, 2022

(30) Foreign Application Priority Data

Oct. 10, 2019 (CN) .......................... 201910960014.0

(51) Int. Cl.
*B64G 1/64* (2006.01)
*B64G 1/32* (2006.01)
(Continued)

(52) U.S. Cl.
CPC ............... *B64G 1/32* (2013.01); *B64G 1/242* (2013.01); *B64G 1/64* (2013.01); *B64G 1/66* (2013.01)

(58) Field of Classification Search
CPC . B64G 1/32; B64G 1/242; B64G 1/64; B64G 1/66
See application file for complete search history.

(56) References Cited

U.S. PATENT DOCUMENTS

| 5,067,673 | A | * | 11/1991 | Fong | ...................... | B64G 1/281 |
| | | | | | | 244/164 |
| 2009/0206204 | A1 | * | 8/2009 | Rosen | .................... | B64G 1/402 |
| | | | | | | 244/171.1 |
| 2012/0292449 | A1 | * | 11/2012 | Levin | .................. | B64G 1/1085 |
| | | | | | | 244/171.1 |

FOREIGN PATENT DOCUMENTS

| CN | 107719708 A | 2/2018 |
| CN | 107963242 A | 4/2018 |

(Continued)

*Primary Examiner* — Medhat Badawi
*Assistant Examiner* — Vicente Rodriguez
(74) *Attorney, Agent, or Firm* — Bayramoglu Law Offices LLC

(57) ABSTRACT

A spacecraft nutation inhibition method for low-orbit geomagnetic energy storage in-orbit delivery includes: S1, enabling a delivery connection rod to be slidably connected to two mass blocks in a length direction, and adjusting the center of mass of a spacecraft system to pass through a main (Continued)

connecting shaft; S2, respectively measuring, calibrating and adjusting the center of mass and the principal axis of inertia of the delivery connection rod that is to deliver the space target or de-orbit debris; S3, carrying out energy storage delivery; S4, respectively adjusting the center of mass and the moment of inertia of the delivery connection rod after delivering the space target or de-orbit debris; S5, carrying out energy dissipation and unloading; and S6, enabling the spacecraft system to prepare to grab the next space target or de-orbit debris and proceeding to the next delivery work cycle.

15 Claims, 2 Drawing Sheets

(51) Int. Cl.
*B64G 1/24* (2006.01)
*B64G 1/66* (2006.01)

(56) References Cited

FOREIGN PATENT DOCUMENTS

| | | |
|---|---|---|
| CN | 108327931 A | 7/2018 |
| CN | 108528764 A | 9/2018 |
| CN | 110816892 A | 2/2020 |
| CN | 110949690 A | 4/2020 |
| EP | 2671805 A1 | 12/2013 |

* cited by examiner

SPACECRAFT NUTATION INHIBITION METHOD FOR LOW-ORBIT GEOMAGNETIC ENERGY STORAGE IN-ORBIT DELIVERY

CROSS REFERENCE TO THE RELATED APPLICATIONS

This application is the national phase entry of International Application No. PCT/CN2020/097729, filed on Jun. 23, 2020, which is based upon and claims priority to Chinese Patent Application No. 201910960014.0, filed on Oct. 10, 2019, the entire contents of which are incorporated herein by reference.

TECHNICAL FIELD

The present invention relates to the technical filed of low-orbit geomagnetic energy storage in-orbit delivery.

BACKGROUND

When a spacecraft system delivers targets in orbit using a geomagnetic energy storage method in low-orbit space, a major problem occurs that there is a possibility that the rotation axis of the delivery mechanism of the spacecraft system does not pass through the center of mass of the spacecraft system, which leads to rotation nutation of the spacecraft system. Under the environment of no air damping in the low-orbit space, the nutation phenomenon is very dangerous for the spacecraft system.

The factors that cause the rotation axis of the spacecraft system not to pass through its center of mass are as follows. 1) The state of the spacecraft system changes, for example, part of the fuel is consumed while working in orbit, or the equipment, load, etc., carried by the spacecraft system moves or rotates. 2) The spacecraft system captures an unknown space target or de-orbit debris, resulting in unknown changes in the mass and the center of mass of the spacecraft system. 3) The mass and the center of mass of the spacecraft system also change at the moment the spacecraft system delivers the space target or de-orbit debris.

Considering that the mass and the center of mass of the spacecraft system also change correspondingly at the moment the spacecraft system delivers the space target or de-orbit debris, designing and developing a spacecraft nutation inhibition method for low-orbit geomagnetic energy storage in-orbit delivery are in urgent need.

SUMMARY

The object of the present invention is to provide a spacecraft nutation inhibition method for low-orbit geomagnetic energy storage in-orbit delivery to effectively inhibit the in-orbit free nutation ability of the spacecraft system, before or after several state mutations in the processes of geomagnetic energy storage rotation delivery, energy dissipation and unloading, and re-delivery preparation.

The above object of the present invention is achieved by the following technical solutions.

A spacecraft nutation inhibition method for low-orbit geomagnetic energy storage in-orbit delivery, which includes:

S1, dividing a spacecraft system into a first spacecraft main body and a second spacecraft main body which are fixedly connected by a main connecting shaft, enabling two mass blocks to be slidably connected to a delivery connection rod, which is vertically rotatably arranged in the main connecting shaft, in a length direction, and adjusting the center of mass of the spacecraft system to pass through the main connecting shaft;

S2: after the spacecraft system grabs a space target or de-orbit debris and the space target or de-orbit debris is kept at the corresponding position of the delivery connection rod, respectively measuring, calibrating and adjusting the center of mass and a principal axis of inertia of the delivery connection rod that is to deliver the space target or de-orbit debris, enabling the main connecting shaft, the rotation axis of the adjusted delivery connection rod, to pass through the center of mass of the spacecraft system that has grabbed a space target or de-orbit debris and to overlap with the principal axis of inertia in the rotation direction of the delivery connection rod, and enabling a delivery plane in which the delivery connection rod rotates vertically around the main connecting shaft to pass through the center of mass of the spacecraft system that has grabbed a space target or de-orbit debris;

S3: carrying out energy storage delivery: carrying out the energy storage acceleration to the delivery connection rod that is to deliver the space target or de-orbit debris, and driving the delivery connection rod to rotate vertically around the main connecting shaft;

S4: when delivery requirements for the space target or de-orbit debris are satisfied, delivering the space target or de-orbit debris, and respectively adjusting the center of mass and the moment of inertia of the delivery connection rod that has delivered the space target or de-orbit debris;

S5: carrying out energy dissipation and unloading, wherein the unloading process is reverse to the energy storage delivery process, and is to dissipate and unload the moment of inertia of the delivery connection rod that rotates vertically around the main connecting shaft until the rotation stops; and S6: enabling the spacecraft system to prepare to grab a next space target or de-orbit debris, and proceeding to the next delivery work cycle.

By adopting the above technical solutions, the spacecraft system adopts a separated structure, the main connecting shaft is connected with a linear telescopic mechanism for measuring whether the center of mass of the spacecraft system passes through the main connecting shaft, mass blocks for adjusting the center of mass of the spacecraft system are slidably connected to the delivery connection rod in the length direction, and a holder for holding the space target or de-orbit debris is arranged at the end of the delivery connection rod. The sequence of attitude rotation measurement and the center of mass adjustment is reasonably allocated such that the center of mass of the spacecraft system is always kept at the intersection of the main connecting shaft and the delivery plane in which the delivery connection rod vertically rotates around the main connecting shaft before or after several state mutations in the processes of geomagnetic energy storage rotation delivery, energy dissipation and unloading and re-delivery preparation, thereby effectively inhibiting nutation from occurring in the spacecraft system due to the rotating principal axis of inertia not passing through the center of mass.

The present invention is further configured in that, the adjustment step in the step S1 specifically involves with:

(1) sliding the two mass blocks on the delivery connection rod back to the main connecting shaft before the spacecraft system grabs the space target or de-orbit debris to be delivered;

(2) enabling the linear telescopic device connected to the main connecting shaft to perform stretch and retraction operation to lengthen or shorten relative position between the first spacecraft main body and the second spacecraft main body respectively connected at the two ends of the main connecting shaft, and measuring the attitude rotation change of the spacecraft system during the stretch and retraction operation of the linear telescopic device, wherein the center of mass of the spacecraft system does not pass through the main connecting shaft if the attitude rotation change occurs in the spacecraft system;

(3) adjusting mass distribution inside the first spacecraft main body and the second spacecraft main body, and repeating the step (2) until the attitude rotation change does not occur in the spacecraft system during the stretch and retraction operation of the linear telescopic device, thereby adjusting the center of mass of the spacecraft system to pass through the main connecting shaft;

(4) sliding the two mass blocks on the delivery connection rod, and measuring that the attitude rotation change occurs in the spacecraft system during the sliding of the mass block, which indicates that the center of mass of the spacecraft system is not located in a delivery plane in which the delivery connection rod vertically rotates around the main connecting shaft;

(5) enabling the linear telescopic device to perform the stretch and retraction operation until the attitude rotation change does not occur in the spacecraft system after the step (4) is repeated in a certain stretch or retraction state of the linear telescopic device, thereby enabling the center of mass of the spacecraft system to be located on the main connecting shaft and in the delivery plane in which the delivery connection rod vertically rotates around the main connecting shaft at the same time, and then sliding the two mass blocks on the delivery connection rod back to the main connecting shaft, wherein under no-load conditions, the said stretch or retraction state of the linear telescopic device is calibrated as the no-load zero position of the corresponding delivery connection rod; and (6) calibrating the no-load zero position of the stretch or retraction state of the linear telescopic device corresponding to each delivery connection rod under no-load conditions according to the above steps.

By adopting the above technical solution, before the spacecraft system grabs the space target or de-orbit debris, two mass blocks are slid along the length direction of the delivery connection rod to adjust the center of mass of the spacecraft system to pass through the main connecting shaft, so as to calibrate the no-load zero position of the stretch or retraction state of the linear telescopic device corresponding to each delivery connection rod under no-load conditions.

The present invention is further configured in that, the adjustment step in step S2 specifically involves with:

(1) after the spacecraft system grabs the space target or de-orbit debris to be delivered and the space target or de-orbit debris is kept at the corresponding position of the delivery connection rod, sliding two mass blocks along the length direction of the delivery connection rod until the attitude rotation change does not occur in the spacecraft system during the stretch and retraction operation of the linear telescopic device, such that the two mass blocks are located at balance positions on the delivery connection rod that is to deliver the space target or de-orbit debris, and the center of mass of the delivery connection rod that is to deliver the space target or de-orbit debris passes through the main connecting shaft;

(2) adjusting the linear telescopic device to the stretch or retraction state of no-load zero position corresponding to the said delivery connection rod;

(3) analyzing the positions of the two mass blocks with certain mass on the said delivery connection rod to minimize the moments of inertia of the two mass blocks relative to the main connecting shaft which is the rotation axis of the said delivery connection rod, in consideration of the two mass blocks being located at the balance positions on the delivery connection rod that is to deliver the space target or de-orbit debris, obtaining predetermined optimum position of the two mass blocks for the space target or de-orbit debris to be delivered, which is calibrated to be delivery zero position of the said delivery connection rod after the spacecraft system grabs the space target or de-orbit debris; and (4) calibrating the delivery zero position of each delivery connection rod after the spacecraft system grabs the space target or de-orbit debris according to the above steps, thereby completing the center of mass adjustment after the spacecraft system grabs the space target or de-orbit debris.

By adopting the above technical solution, the center of mass and the principal axis of inertia of the delivery connection rod that is to deliver the space target or de-orbit debris are respectively calibrated and adjusted, such that the main connecting shaft, the rotation axis of the said delivery connection rod, passes through the center of mass of the spacecraft system that has grabbed a space target or de-orbit debris and overlaps with the principal axis of inertia in the rotation direction of the said delivery connection rod, and the delivery plane in which the said delivery connection rod rotates vertically around the main connecting shaft passes through the center of mass of the spacecraft system that has grabbed the space target or de-orbit debris.

The present invention is further configured in that, the attitude rotation change occurring in the spacecraft system is pitch, yaw, or roll angle change.

By adopting the above technical solution, the attitude rotation change of the spacecraft system is measured to determine whether or not the center of mass of the spacecraft system passes through the main connecting shaft.

The present invention is further configured in that, when a delivery connection rod is vertically rotatably arranged in the main connecting shaft, in the step S3, the delivery connection rod performs energy storage accelerated rotation by the geomagnetic energy storage method.

By adopting the above technical solution, in the spacecraft system with one delivery connection rod rotatably arranged in the main connecting shaft, the external torque of an orthogonal strong magnetic moment generating device in the geomagnetic field is balanced to the internal torque of a transmission support of the torque transmission mechanism by the inverse reaction of a unidirectional rotating member, the accelerated rotation of the attitude does not occur in the spacecraft system during the energy storage acceleration process.

The present invention is further configured in that, when two delivery connection rods are vertically rotatably arranged in the main connecting shaft, in the step S3, the two delivery connection rods are driven by a contra-rotating transmission mechanism to perform reverse energy storage accelerated rotation.

By adopting the above technical solution, in the spacecraft system with two delivery connection rods rotatably arranged in the main connecting shaft, the geomagnetic energy storage acceleration method is not adopted, and the internal torque of the fixed support of the contra-rotating transmission mechanism by the inverse reaction of the forward rotating member is balanced to the internal torque by the inverse reaction of the counter-rotating member, and the accelerated rotation of the attitude does not occur in the spacecraft system during the energy storage acceleration process.

The present invention is further configured in that, the adjustment step of the delivery connection rod that has delivered the space target or de-orbit debris in the step S4 specifically involves with: adjusting the positions of the two mass blocks on the delivery connection rod that has delivered the space target or de-orbit debris, adjusting the center of mass of the said delivery connection rod to the main connecting shaft, and enabling the moment of inertia of the said delivery connection rod rotating around the main connecting shaft to be equal to the instantaneous moment of inertia after delivering the space target or de-orbit debris.

By adopting the above technical solution, in the spacecraft system with one delivery connection rod rotatably arranged in the main connecting shaft, the adjustment of the center of mass and the moment of inertia of the delivery connection rod that has delivered the space target or de-orbit debris is finished.

The present invention is further configured in that, the adjustment step of the delivery connection rod that has delivered the space target or de-orbit debris in the step S4 specifically involves with:

(1) adjusting the positions of the two mass blocks on the delivery connection rod that has delivered a first space target or de-orbit debris, adjusting the center of mass of the said delivery connection rod to the main connecting shaft, and enabling the moment of inertia of the said delivery connection rod rotating around the main connecting shaft to be equal to the instantaneous moment of inertia after delivering the first space target or de-orbit debris;

(2) enabling the linear telescopic device to perform the stretch and retraction operation to adjust the center of mass of the spacecraft system to the delivery plane in which the delivery connection rod that is to deliver a second space target or de-orbit debris rotates vertically around the main connecting shaft, and delivering the second space target or de-orbit debris when the delivery requirement is satisfied; and (3) adjusting the positions of the two mass blocks on the delivery connection rod that has delivered the second space target or de-orbit debris, adjusting the center of mass of the said delivery connection rod to the main connecting shaft, and enabling the moment of inertia of the said delivery connection rod rotating around the main connecting shaft to be equal to the instantaneous moment of inertia after delivering the second space target or de-orbit debris.

By adopting the above technical solution, in the spacecraft system with two delivery connection rods rotatably arranged in the main connecting shaft, the adjustment of the center of mass and the moment of inertia of each of the two delivery connection rods that have delivered the space target or de-orbit debris is sequentially completed.

The present invention is further configured in that, the energy dissipation and unloading in the step S5 specifically involves with adopting the magnetic moment generated by the orthogonal strong magnetic moment generating device to reversely act on the moment of inertia of the delivery connection rod which rotates continuously.

By adopting the above technical solution, in the spacecraft system with one delivery connection rod rotatably arranged in the main connecting shaft, the magnetic moment generated by the orthogonal strong magnetic moment generating device reversely acts on the moment of inertia of the delivery connection rod which rotates continuously, thereby dissipating and unloading the moment of inertia of the delivery connection rod that rotates vertically around the main connecting shaft until the rotation stops.

The present invention is further configured in that, the energy dissipation and unloading in the step S5 specifically involves with adopting the magnetic moment generated by the orthogonal strong magnetic moment generating device to reversely act on the residual moment of inertia of the two delivery connection rods that rotate continuously oppositely.

By adopting the above technical solution, in the spacecraft system with two delivery connection rods rotatably arranged in the main connecting shaft, the magnetic moment generated by the orthogonal strong magnetic moment generating device reversely acts on the residual moment of inertia of the two delivery connection rods which rotate continuously, thereby dissipating and unloading the moment of inertia of the two delivery connection rods that rotate vertically around the main connecting shaft until the rotation stops.

NUMERALS IN THE DRAWINGS

1. first spacecraft main body; 2. second spacecraft main body; 3. main connecting shaft; 4. linear telescopic mechanism; 5. orthogonal strong magnetic moment generating device; 6. torque transmission mechanism; 61. transmission support; 62. unidirectional rotating member; 7. delivery connection rod; 71. holding mechanism; 72. mass block; 8. contra-rotating transmission mechanism; 81. fixed support; 82. forward rotating member; 83. counter-rotating member.

DETAILED DESCRIPTION OF THE EMBODIMENTS

Figure 1:
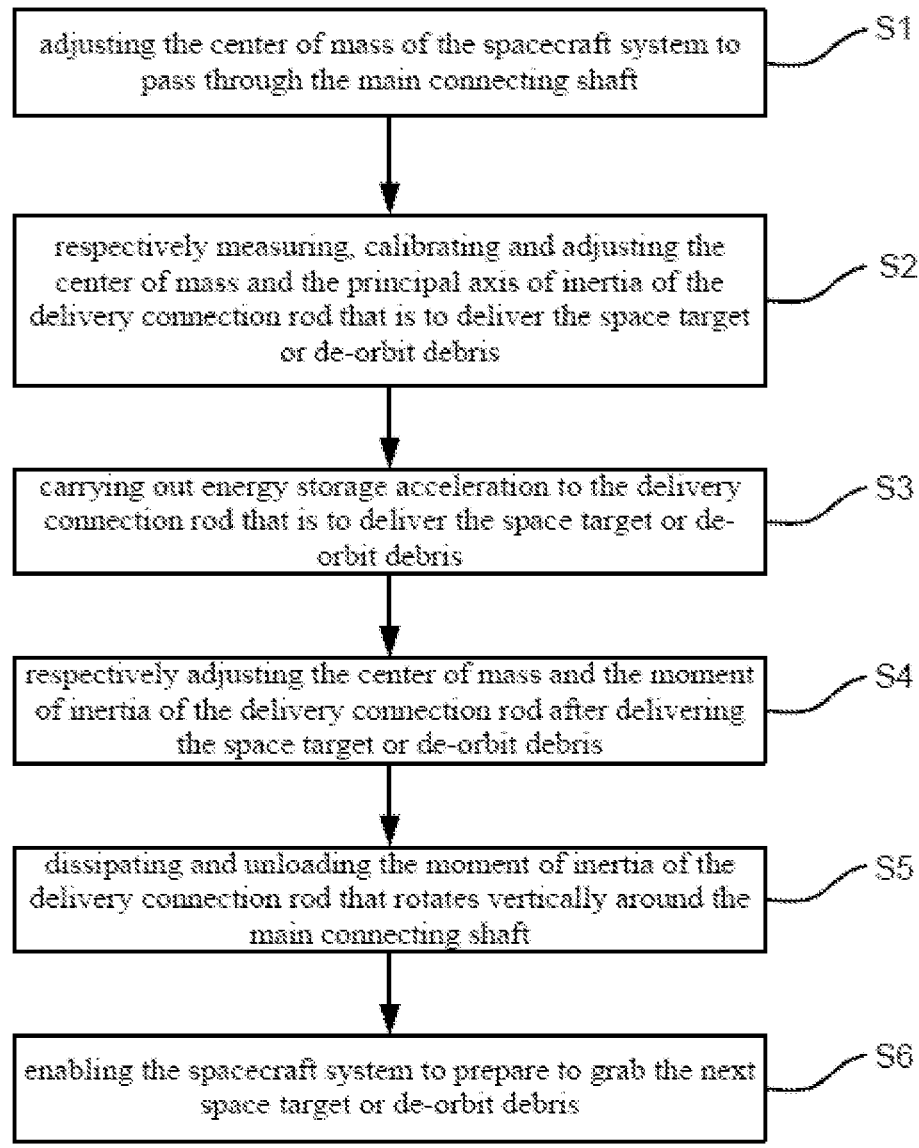
FIG. 1 is a control flowchart of the inhibition method of the present invention.
Figure 2:
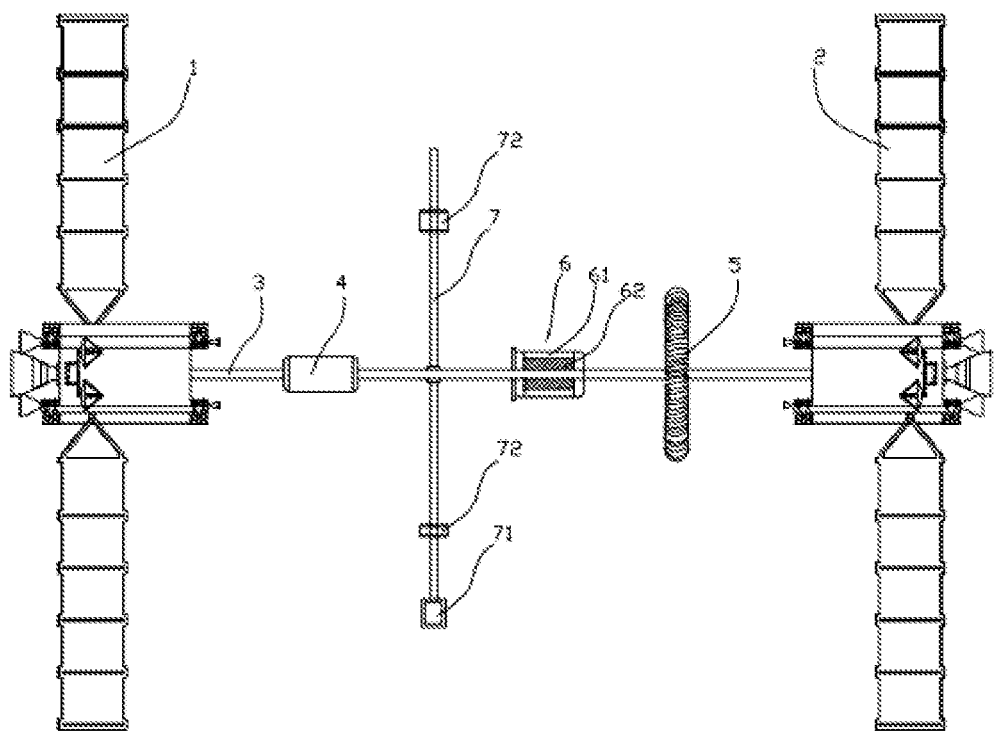
FIG. 2 is a schematic diagram illustrating the structure of the spacecraft system according to the first embodiment of the present invention.

With reference to FIGS. 1 and 2, the present invention discloses a spacecraft nutation inhibition method for low-orbit geomagnetic energy storage in-orbit delivery, which includes the following control steps.

S1, Dividing a spacecraft system into a first spacecraft main body 1 and a second spacecraft main body 2 which are fixedly connected by a main connecting shaft 3, enabling two mass blocks 72 to be slidably connected to a delivery connection rod 7, which is vertically rotatably arranged in the main connecting shaft 3, in a length direction, and adjusting the center of mass of the spacecraft system to pass through the main connecting shaft 3. The adjustment step specifically involves with:

(1) sliding the two mass blocks 72 on the delivery connection rod 7 back to the main connecting shaft 3 before the spacecraft system grabs the space target or de-orbit debris to be delivered;

(2) enabling the linear telescopic device connected to the main connecting shaft 3 to perform stretch and retraction operation to lengthen or shorten relative position between the first spacecraft main body 1 and the second spacecraft main body 2 respectively connected at the two ends of the main connecting shaft 3, and measuring the attitude rotation change of the spacecraft system during the stretch and retraction operation of the linear telescopic device 4, wherein the attitude rotation change occurring in the spacecraft system is pitch, yaw, or roll angle change, and the center of mass of the spacecraft system does not pass through the main connecting shaft 3 if the attitude rotation change occurs in the spacecraft system;

(3) adjusting mass distribution inside the first spacecraft main body 1 and the second spacecraft main body 2, and repeating the step (2) until the attitude rotation change does not occur in the spacecraft system during the stretch and retraction operation of the linear telescopic device, thereby adjusting the center of mass of the spacecraft system to pass through the main connecting shaft 3;

(4) sliding the two mass blocks 72 on the delivery connection rod 7, and measuring that the attitude rotation change occurs in the spacecraft system during the sliding of the mass block 72, which indicates that the center of mass of the spacecraft system is not located in a delivery plane in which the delivery connection rod 7 vertically rotates around the main connecting shaft 3; and (5) enabling the linear telescopic device to perform the stretch and retraction operation until the attitude rotation change does not occur in the spacecraft system after the step (4) is repeated in a certain stretch or retraction state of the linear telescopic device, thereby enabling the center of mass of the spacecraft system to be located on the main connecting shaft 3 and in the delivery plane in which the delivery connection rod 7 vertically rotates around the main connecting shaft 3 at the same time, and then sliding the two mass blocks 72 on the delivery connection rod 7 back to the main connecting shaft 3, wherein under no-load conditions, the said stretch or retraction state of the linear telescopic device is calibrated as the no-load zero position of the corresponding delivery connection rod 7.

S2: After the spacecraft system grabs a space target or de-orbit debris and the space target or de-orbit debris is kept at the corresponding position of the delivery connection rod, respectively measuring, calibrating and adjusting the center of mass and a principal axis of inertia of the delivery connection rod 7 that is to deliver the space target or de-orbit debris, enabling the main connecting shaft 3, the rotation axis of the adjusted delivery connection rod, to pass through the center of mass of the spacecraft system that has grabbed a space target or de-orbit debris and to overlap with the principal axis of inertia in the rotation direction of the said delivery connection rod 7, and enabling a delivery plane in which the said delivery connection rod 7 rotates vertically around the main connecting shaft 3 to pass through the center of mass of the spacecraft system that has grabbed a space target or de-orbit debris. The adjustment step specifically involves with:

(1) after the spacecraft system grabs the space target or de-orbit debris to be delivered and the space target or de-orbit debris is kept at the corresponding position of the delivery connection rod 7, sliding two mass blocks 72 along the length direction of the delivery connection rod 7 until the attitude rotation change does not occur in the spacecraft system during the stretch and retraction operation of the linear telescopic device, such that the two mass blocks 72 are located at balance positions on the delivery connection rod 7 that is to deliver the space target or de-orbit debris, and the center of mass of the delivery connection rod 7 that is to deliver the space target or de-orbit debris passes through the main connecting shaft 3;

(2) adjusting the linear telescopic device to the stretch or retraction state of no-load zero position corresponding to the said delivery connection rod; and (3) analyzing the positions of the two mass blocks 72 with certain mass on the said delivery connection rod 7 to minimize the moments of inertia of the two mass blocks 72 relative to the main connecting shaft 3 which is the rotation axis of the said delivery connection rod, in consideration of the two mass blocks 72 being located at the balance positions on the delivery connection rod 7 that is to deliver the space target or de-orbit debris, obtaining predetermined optimum position of the two mass blocks 72 for the space target or de-orbit debris to be delivered, which is calibrated to be delivery zero position of the said delivery connection rod 7 after the spacecraft system grabs the space target or de-orbit debris, thereby completing the adjustment of the center of mass of the spacecraft system that has grabbed a space target or de-orbit debris.

S3: Carrying out energy storage delivery: carrying out the energy storage acceleration to the delivery connection rod 7 that is to deliver the space target or de-orbit debris, and driving the delivery connection rod 7 to rotate vertically around the main connecting shaft 3, wherein the delivery connection rod 7 performs energy storage accelerated rotation by the geomagnetic energy storage method.

S4: When delivery requirements for the space target or de-orbit debris are satisfied, delivering the space target or de-orbit debris, and respectively adjusting the center of mass and the moment of inertia of the delivery connection rod 7 that has delivered the space target or de-orbit debris. The adjustment step specifically involves with: adjusting the positions of the two mass blocks 72 on the delivery connection rod 7 that has delivered the space target or de-orbit debris, adjusting the center of mass of the said delivery connection rod 7 to the main connecting shaft 3, and enabling the moment of inertia of the said delivery connection rod 7 rotating around the main connecting shaft 3 to be equal to the instantaneous moment of inertia after delivering the space target or de-orbit debris.

S5: Carrying out energy dissipation and unloading, wherein the unloading process is reverse to the energy storage delivery process, and is to dissipate and unload the moment of inertia of the delivery connection rod 7 that rotates vertically around the main connecting shaft 3, and the magnetic moment generated by the orthogonal strong magnetic moment generating device 5 reversely acts on the moment of inertia of the delivery connection rod 7 which rotates continuously until the rotation stops.

S6: Enabling the spacecraft system to prepare to grab a next space target or de-orbit debris, and proceeding to the next delivery work cycle.

The spacecraft system includes a first spacecraft main body 1 and a second spacecraft main body 2. The first spacecraft main body 1 and the second spacecraft main body 2 are fixedly connected by a main connecting shaft 3, and the spacecraft main body system is distributed on the first spacecraft main body 1 and the second spacecraft main body 2 at both ends of the main connecting shaft 3. The main connecting shaft 3 is connected with a linear telescopic mechanism 4 for adjusting the center of mass of the spacecraft system to pass through the main connecting shaft 3. A delivery connection rod 7 is vertically rotatably arranged in the middle of the main connecting shaft 3. Two mass blocks 72 are slidably connected to the delivery connection rod 7 in the length direction, and a holding mechanism 71 for holding a space target or de-orbit debris is arranged at the end of the delivery connection rod 7. An orthogonal strong magnetic moment generating device 5 and a torque transmission mechanism 6 are fixedly installed on the main connecting shaft 3. The torque transmission mechanism 6 includes a transmission support 61 fixed to the main connecting shaft 3, and a unidirectional rotating member 62 for driving the delivery connection rod 7 to rotate around the main connecting shaft 3. The unidirectional rotating member 62 is rotatably installed on the transmission support 61. The interacting internal torque is generated between the transmission support 61 and the unidirectional rotating member 62 when the torque transmission mechanism 6 starts to work. When the delivery connection rod 7 of the torque transmission mechanism 6 is in the geomagnetic energy storage rotational delivery state, the internal torque of the transmission support 61 of the torque transmission mechanism 6 by the inverse reaction of the unidirectional rotating member 62 and the external torque of the orthogonal strong magnetic moment generating device 5 in the geomagnetic field are opposite in direction and the same in magnitude. The orthogonal strong magnetic moment generating device 5 is composed of two orthogonally-arranged solenoid coils, and the planes of the two solenoid coils are both perpendicular to the main connecting shaft 3. The orthogonal strong magnetic moment generating device 5 further includes a low temperature system. The two orthogonally-arranged solenoid coils are made of superconductor material.

The spacecraft main body system includes energy subsystem, control system, communication system, orbit/attitude measurement sensor, solar cell array and auxiliary work load. The linear telescopic mechanism 4 is electrically connected to the energy subsystem or the solar cell array, and is connected to a controller in a controllable manner. The two telescopic ends of the linear telescopic mechanism 4 are respectively fixedly connected with the left half and the right half of the main connecting shaft 3. During the stretch and retraction process of the linear telescopic mechanism 4, the left half and the right half of the main connecting shaft 3 are located on the same straight line. The orthogonal strong magnetic moment generating device 5 is electrically connected to the energy subsystem or the solar cell array, and is connected to the controller in a controllable manner. The torque transmission mechanism 6 is electrically connected to the energy subsystem or the solar cell array, and is connected to the controller in a controllable manner. The torque transmission mechanism 6 is a torque motor. The transmission support 61 is the stator assembly of the torque motor. The unidirectional rotating member 62 is the rotor assembly of the torque motor.

Second Embodiment

Figure 3:
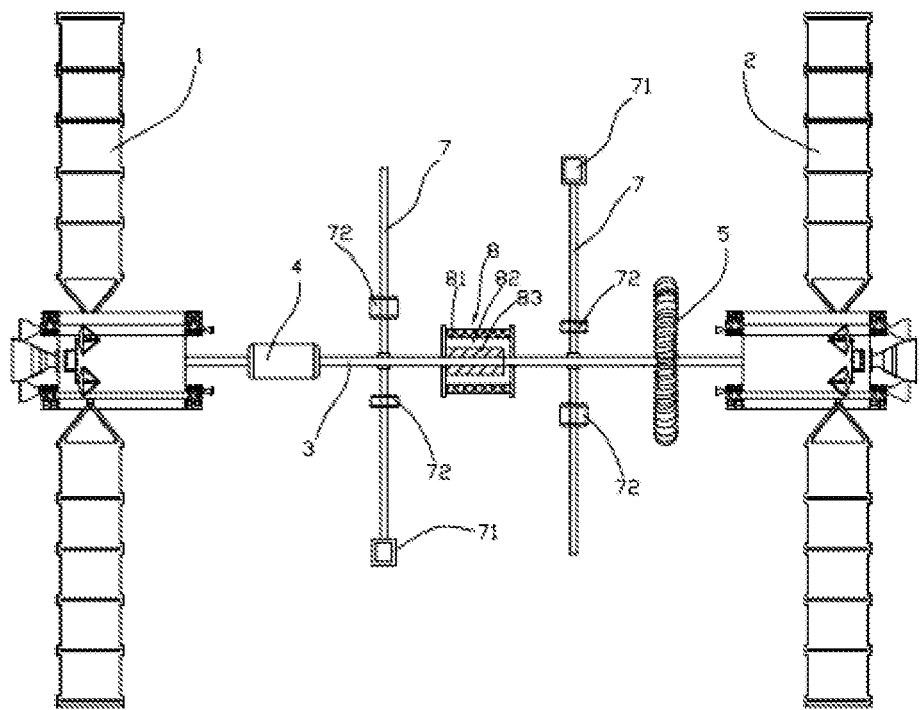
FIG. 3 is a schematic diagram illustrating the structure of the spacecraft system according to the second embodiment of the present invention.

With reference to FIGS. 1 and 3, the present invention discloses a spacecraft nutation inhibition method for low-orbit geomagnetic energy storage in-orbit delivery, which includes the following control steps.

S1, Dividing a spacecraft system into a first spacecraft main body 1 and a second spacecraft main body 2 which are fixedly connected by a main connecting shaft 3, enabling two mass blocks 72 to be slidably connected to a delivery connection rod 7, which is vertically rotatably arranged in the main connecting shaft 3, in a length direction, and adjusting the center of mass of the spacecraft system to pass through the main connecting shaft 3. The adjustment step specifically involves with:

(1) sliding the two mass blocks 72 on the delivery connection rod 7 back to the main connecting shaft 3 before the spacecraft system grabs the space target or de-orbit debris to be delivered;

(2) enabling the linear telescopic device connected to the main connecting shaft 3 to perform stretch and retraction operation to lengthen or shorten relative position between the first spacecraft main body 1 and the second spacecraft main body 2 respectively connected at the two ends of the main connecting shaft 3, and measuring the attitude rotation change of the spacecraft system during the stretch and retraction operation of the linear telescopic device 4, wherein the attitude rotation change occurring in the spacecraft system is pitch, yaw, or roll angle change, and the center of mass of the spacecraft system does not pass through the main connecting shaft 3 if the attitude rotation change occurs in the spacecraft system;

(3) adjusting mass distribution inside the first spacecraft main body 1 and the second spacecraft main body 2, and repeating the step (2) until the attitude rotation change does not occur in the spacecraft system during the stretch and retraction operation of the linear telescopic device 4, thereby adjusting the center of mass of the spacecraft system to pass through the main connecting shaft 3;

(4) sliding the two mass blocks 72 on the delivery connection rod 7, and measuring that the attitude rotation change occurs in the spacecraft system during the sliding of the mass block 72, which indicates that the center of mass of the spacecraft system is not located in a delivery plane in which the delivery connection rod 7 vertically rotates around the main connecting shaft 3; and (5) enabling the linear telescopic device to perform the stretch and retraction operation until the attitude rotation change does not occur in the spacecraft system after the step (4) is repeated in a certain stretch or retraction state of the linear telescopic device, thereby enabling the center of mass of the spacecraft system to be located on the main connecting shaft 3 and in the delivery plane in which the delivery connection rod 7 vertically rotates around the main connecting shaft 3 at the same time, and then sliding the two mass blocks 72 on the delivery connection rod 7 back to the main connecting shaft 3, wherein under no-load conditions, the said stretch or retraction state of the linear telescopic device is calibrated as the no-load zero position of the corresponding delivery connection rod 7; and (6) calibrating the no-load zero position of the stretch or retraction state of the linear telescopic device corresponding to each delivery connection rod 7 under no-load conditions according to the above steps.

S2: After the spacecraft system grabs a space target or de-orbit debris and the space target or de-orbit debris is kept at the corresponding position of the delivery connection rod, respectively measuring, calibrating and adjusting the center of mass and a principal axis of inertia of the delivery connection rod 7 that is to deliver the space target or de-orbit debris, enabling the main connecting shaft 3, the rotation axis of the adjusted delivery connection rod 7, to pass through the center of mass of the spacecraft system that has grabbed a space target or de-orbit debris and to overlap with the principal axis of inertia in the rotation direction of the said delivery connection rod 7, and enabling a delivery plane in which the said delivery connection rod 7 rotates vertically around the main connecting shaft 3 to pass through the center of mass of the spacecraft system that has grabbed a space target or de-orbit debris. The adjustment step specifically involves with:

(1) after the spacecraft system grabs the space target or de-orbit debris to be delivered and the space target or de-orbit debris is kept at the corresponding position of the delivery connection rod 7, sliding two mass blocks 72 along the length direction of the delivery connection rod 7 until the attitude rotation change does not occur in the spacecraft system during the stretch and retraction operation of the linear telescopic device, such that the two mass blocks 72 are located at balance positions on the delivery connection rod 7 that is to deliver the space target or de-orbit debris, and the center of mass of the delivery connection rod 7 that is to deliver the space target or de-orbit debris passes through the main connecting shaft 3;

(2) adjusting the linear telescopic device to the stretch or retraction state of no-load zero position corresponding to the said delivery connection rod 7; and (3) analyzing the positions of the two mass blocks 72 with certain mass on the said delivery connection rod 7 to minimize the moments of inertia of the two mass blocks 72 relative to the main connecting shaft 3 which is the rotation axis of the said delivery connection rod 7, in consideration of the two mass blocks 72 being located at the balance positions on the delivery connection rod 7 that is to deliver the space target or de-orbit debris, obtaining predetermined optimum position of the two mass blocks 72 for the space target or de-orbit debris to be delivered, which is calibrated to be delivery zero position of the said delivery connection rod 7 after the spacecraft system grabs the space target or de-orbit debris; and (4) calibrating the delivery zero position of each delivery connection rod 7 after the spacecraft system grabs the space target or de-orbit debris according to the above steps, thereby completing the center of mass adjustment after the spacecraft system grabs the space target or de-orbit debris.

S3: Carrying out energy storage delivery: carrying out the energy storage acceleration to the delivery connection rod 7 that is to deliver the space target or de-orbit debris, and driving the delivery connection rod 7 to rotate vertically around the main connecting shaft 3, wherein the two delivery connection rods 7 are driven by a contra-rotating transmission mechanism 8 to perform reverse energy storage accelerated rotation.

S4: When delivery requirements for the space target or de-orbit debris are satisfied, delivering the space target or de-orbit debris, and respectively adjusting the center of mass and the moment of inertia of the delivery connection rod 7 that has delivered the space target or de-orbit debris. The adjustment step specifically involves with:

(1) adjusting the positions of the two mass blocks 72 on the delivery connection rod 7 that has delivered a first space target or de-orbit debris, adjusting the center of mass of the said delivery connection rod 7 to the main connecting shaft 3, and enabling the moment of inertia of the said delivery connection rod 7 rotating around the main connecting shaft 3 to be equal to the instantaneous moment of inertia after delivering the first space target or de-orbit debris;

(2) enabling the linear telescopic device to perform the stretch and retraction operation to adjust the center of mass of the spacecraft system to the delivery plane in which the delivery connection rod 7 that is to deliver a second space target or de-orbit debris rotates vertically around the main connecting shaft 3, and delivering the second space target or de-orbit debris when the delivery requirement is satisfied; and (3) adjusting the positions of the two mass blocks 72 on the delivery connection rod 7 that has delivered the second space target or de-orbit debris, adjusting the center of mass of the said delivery connection rod 7 to the main connecting shaft 3, and enabling the moment of inertia of the said delivery connection rod 7 rotating around the main connecting shaft 3 to be equal to the instantaneous moment of inertia after delivering the second space target or de-orbit debris.

S5: Carrying out energy dissipation and unloading, wherein the unloading process is reverse to the energy storage delivery process, and is to dissipate and unload the moment of inertia of the delivery connection rod 7 that rotates vertically around the main connecting shaft 3, and the magnetic moment generated by the orthogonal strong magnetic moment generating device 5 reversely acts on the residual moment of inertia of the two delivery connection rods 7 that rotate continuously oppositely until the rotation stops.

S6: Enabling the spacecraft system to prepare to grab a next space target or de-orbit debris, and proceeding to the next delivery work cycle.

The spacecraft system includes a first spacecraft main body 1 and a second spacecraft main body 2. The first spacecraft main body 1 and the second spacecraft main body 2 are fixedly connected by a main connecting shaft 3, and the spacecraft main body system is distributed on the first spacecraft main body 1 and the second spacecraft main body 2 at both ends of the main connecting shaft 3. The main connecting shaft 3 is connected with a linear telescopic mechanism 4 for adjusting the center of mass of the spacecraft system to pass through the main connecting shaft 3. A delivery connection rod 7 is vertically rotatably arranged in the middle of the main connecting shaft 3. Two mass blocks 72 are slidably connected to the delivery connection rod 7 in the length direction, and a holding mechanism 71 for holding a space target or de-orbit debris is arranged at the end of the delivery connection rod 7. An orthogonal strong magnetic moment generating device 5 and a contra-rotating transmission mechanism 8 are fixedly installed on the main connecting shaft 3. The contra-rotating transmission mechanism 8 is located between the two delivery connection rods 7. The contra-rotating transmission mechanism 8 includes a fixed support 81 fixed to the main connecting shaft 3, a forward rotating member 82 for driving one of the delivery connection rods 7 to rotate in the forward direction around the main connecting shaft 3, and a reverse rotating member 82 for driving the other of the delivery connection rods 7 to rotate in the reverse direction around the main connecting shaft 3. Both the forward rotating member 82 and the reverse rotating member 83 are rotatably mounted on the fixed support 81. The interacting internal torque is generated between the fixed support 81 and the forward rotating member 82 or the reverse rotating member 83 when contra-rotating transmission mechanism 8 starts to work. When the two delivery connection rods 7 of the contra-rotating transmission mechanism 8 are in a contra-rotating delivery state, the internal torque of the fixed support 81 of the contra-rotating transmission mechanism 8 by the inverse reaction of the forward rotating member 82 and the external torque by the inverse reaction of the reverse rotating member 83 are opposite in direction and the same in magnitude. The orthogonal strong magnetic moment generating device 5 is composed of two orthogonally-arranged solenoid coils, and the planes of the two solenoid coils are both perpendicular to the main connecting shaft 3. The orthogonal strong magnetic moment generating device 5 further includes a low temperature system. The two orthogonally-arranged solenoid coils are made of superconductor material.

The spacecraft main body system includes energy subsystem, control system, communication system, orbit/attitude measurement sensor, solar cell array and auxiliary work load. The linear telescopic mechanism 4 is electrically connected to the energy subsystem or the solar cell array, and is connected to a controller in a controllable manner. The two telescopic ends of the linear telescopic mechanism 4 are respectively fixedly connected with the left half and the right half of the main connecting shaft 3. During the stretch and retraction process of the linear telescopic mechanism 4, the left half and the right half of the main connecting shaft 3 are located on the same straight line. The orthogonal strong magnetic moment generating device 5 is electrically connected to the energy subsystem or the solar cell array, and is connected to the controller in a controllable manner. The contra-rotating transmission mechanism 8 is electrically connected to the energy subsystem or the solar cell array, and is connected to the controller in a controllable manner. The contra-rotating transmission mechanism 8 is a dual-rotor torque motor. The fixed support 81 is the stator assembly of a dual-rotor torque motor. The forward rotation member 82 and the reverse rotation member 83 are respectively two rotor assemblies of a dual-rotor torque motor with opposite rotation directions, and the forward rotation member 82 and the reverse rotation member 83 are arranged coaxially.

The implementation principle of the present embodiment is as below. The spacecraft system adopts a separated structure, the main connecting shaft 3 is connected with a linear telescopic mechanism for measuring whether the center of mass of the spacecraft system passes through the main connecting shaft 3, mass blocks 72 for adjusting the center of mass of the spacecraft system are slidably connected to the delivery connection rod 7 in the length direction, and a holder for holding the space target or de-orbit debris is arranged at the end of the delivery connection rod 7. The inhibition method of the present embodiment reasonably allocates the sequence of attitude rotation measurement and the center of mass adjustment, such that the center of mass of the spacecraft system is always kept at the intersection of the main connecting shaft 3 and the delivery plane in which the delivery connection rod vertically rotates around the main connecting shaft before or after several state mutations in the processes of geomagnetic energy storage rotation delivery, energy dissipation and unloading and re-delivery preparation, then completes the adjustment of the center of mass and moment of inertia of the delivery connection rod 7 after delivering the space target or off-orbit debris, dissipates and unloads the moment of inertia of the delivery connection rod 7 which rotates vertically around the main connecting shaft 3, and adopts the magnetic moment generated by the orthogonal strong magnetic moment generating device 5 to reversely act on the moment of inertia of the delivery connection rod which rotates continuously until the rotation stops. Finally, before or after several state mutations in the processes of geomagnetic energy storage rotation delivery, energy dissipation and unloading and re-delivery preparation, the free nutation ability of the spacecraft system can be effectively inhibited.

The embodiments covered by the present invention are all preferred examples of the present invention, but are not intended to limit the scope of protection of the present invention accordingly. Therefore, all equivalent modifications based on the structure, shape, and principle of the present invention shall fall within the protection scope of the present invention.

INDUSTRIAL APPLICABILITY

1. The spacecraft system adopts a separated structure, the main connecting shaft is connected with a linear telescopic mechanism for measuring whether the center of mass of the spacecraft system passes through the main connecting shaft, mass blocks for adjusting the center of mass of the spacecraft system are slidably connected to the delivery connection rod in the length direction, and a holder for holding the space target or de-orbit debris is arranged at the end of the delivery connection rod. The inhibition method of the present invention reasonably allocates the sequence of attitude rotation measurement and the center of mass adjustment, such that the center of mass of the spacecraft system is always kept at the intersection of the main connecting shaft 3 and the delivery plane in which the delivery connection rod vertically rotates around the main connecting shaft before or after several state mutations in the processes of geomagnetic energy storage rotation delivery, energy dissipation and unloading and re-delivery preparation, thereby effectively inhibiting nutation from occurring in the spacecraft system due to the rotating principal axis of inertia not passing through the center of mass.

2. During the energy dissipation and unloading process, the magnetic moment generated by the orthogonal strong magnetic moment generating device reversely acts on the moment of inertia of the delivery connection rod which rotates continuously, thereby dissipating and unloading the moment of inertia of the delivery connection rod that rotates vertically around the main connecting shaft until the rotation stops to prevent the attitude rotation change from occurring in the spacecraft system.

3. After the spacecraft system grabs a space target or de-orbit debris, the main connecting shaft, the rotation axis of the delivery connection rod that is to deliver the space target or de-orbit debris, passes through the center of mass of the spacecraft system that has grabbed a space target or de-orbit debris, and overlaps with the principal axis of inertia in the rotation direction of the said delivery connection rod, and the delivery plane in which the said delivery connection rod rotates vertically around the main connecting shaft passes through the center of mass of the spacecraft system that has grabbed the space target or de-orbit debris.

What is claimed is:

1. A spacecraft nutation inhibition method for a low-orbit geomagnetic energy storage in-orbit delivery, comprising:
    S1: dividing a spacecraft system into a first spacecraft main body and a second spacecraft main body which are fixedly connected by a main connecting shaft, enabling two mass blocks to be slidably connected to a delivery connection rod, which is vertically rotatably arranged in the main connecting shaft in a length direction, and adjusting a center of mass of the spacecraft system to pass through the main connecting shaft;
    S2: after the spacecraft system grabs a space target or de-orbit debris and the space target or the de-orbit debris is kept at a corresponding position of the delivery connection rod, respectively measuring, calibrating and adjusting a center of mass and a principal axis of an inertia of the delivery connection rod that is to deliver the space target or the de-orbit debris, enabling the main connecting shaft, which is a rotation axis of the adjusted delivery connection rod, to pass through the center of mass of the spacecraft system that has grabbed the space target or the de-orbit debris and to overlap with the principal axis of the inertia in the rotation direction of the delivery connection rod, and enabling a delivery plane in which the delivery connection rod rotates vertically around the main connecting shaft to pass through the center of mass of the spacecraft system that has grabbed the space target or the de-orbit debris;

S3: carrying out an energy storage delivery: carrying out an energy storage acceleration to the delivery connection rod that is to deliver the space target or the de-orbit debris, and driving the delivery connection rod to rotate vertically around the main connecting shaft;

S4: when delivery requirements for the space target or the de-orbit debris are satisfied, delivering the space target or the de-orbit debris, and respectively adjusting the center of mass and a moment of the inertia of the delivery connection rod that has delivered the space target or de-orbit debris;

S5: carrying out an energy dissipation and unloading, wherein the unloading process is reverse to the energy storage delivery process, and is to dissipate and unload the moment of the inertia of the delivery connection rod that rotates vertically around the main connecting shaft until a rotation stops; and S6: enabling the spacecraft system to prepare to grab a next space target or de-orbit debris, and proceeding to a next delivery work cycle.

2. The spacecraft nutation inhibition method according to claim 1, wherein an adjustment step in the step S1 specifically involves with:

(1) sliding the two mass blocks on the delivery connection rod back to the main connecting shaft before the spacecraft system grabs the space target or the de-orbit debris to be delivered;

(2) enabling a linear telescopic device connected to the main connecting shaft to perform a stretch and retraction operation to lengthen or shorten a relative position between the first spacecraft main body and the second spacecraft main body respectively connected at two ends of the main connecting shaft, and measuring an attitude rotation change of the spacecraft system during the stretch and retraction operation of the linear telescopic device, wherein the center of mass of the spacecraft system does not pass through the main connecting shaft if the attitude rotation change occurs in the spacecraft system;

(3) adjusting a mass distribution inside the first spacecraft main body and the second spacecraft main body, and repeating the step until the attitude rotation change does not occur in the spacecraft system during the stretch and retraction operation of the linear telescopic device, thereby adjusting the center of mass of the spacecraft system to pass through the main connecting shaft;

(4) sliding the two mass blocks on the delivery connection rod, and measuring that the attitude rotation change occurs in the spacecraft system during the sliding of the two mass blocks, which indicates that the center of mass of the spacecraft system is not located in the delivery plane in which the delivery connection rod vertically rotates around the main connecting shaft;

(5) enabling the linear telescopic device to perform the stretch and retraction operation until the attitude rotation change does not occur in the spacecraft system after the step (4) is repeated in a certain stretch or retraction state of the linear telescopic device, thereby enabling the center of mass of the spacecraft system to be located on the main connecting shaft and in the delivery plane in which the delivery connection rod vertically rotates around the main connecting shaft at the same time, and then sliding the two mass blocks on the delivery connection rod back to the main connecting shaft, wherein under no-load conditions, the certain stretch or retraction state of the linear telescopic device is calibrated as a no-load zero position of the corresponding delivery connection rod; and (6) calibrating a no-load zero position of a stretch or retraction state of the linear telescopic device corresponding to each delivery connection rod under the no-load conditions according to the above steps.

3. The spacecraft nutation inhibition method according to claim 1, wherein an adjustment step in the step S2 specifically involves with:

(1) after the spacecraft system grabs the space target or the de-orbit debris to be delivered, and the space target or the de-orbit debris is kept at the corresponding position of the delivery connection rod, sliding the two mass blocks along the length direction of the delivery connection rod until it is measured that the attitude rotation change does not occur in the spacecraft system during the stretch and retraction operation of the linear telescopic device, such that the two mass blocks are located at balance positions on the delivery connection rod that is to deliver the space target or the de-orbit debris, and the center of mass of the delivery connection rod that is to deliver the space target or the de-orbit debris passes through the main connecting shaft;

(2) adjusting the linear telescopic device to a stretch or retraction state of a no-load zero position corresponding to the delivery connection rod;

(3) analyzing positions of the two mass blocks with a certain mass on the delivery connection rod to minimize moments of an inertia of the two mass blocks relative to the main connecting shaft which is the rotation axis of the delivery connection rod, in consideration of the two mass blocks being located at the balance positions on the delivery connection rod that is to deliver the space target or the de-orbit debris, obtaining a predetermined optimum position of the two mass blocks for the space target or the de-orbit debris to be delivered, which is calibrated to be a delivery zero position of the delivery connection rod after the spacecraft system grabs the space target or the de-orbit debris; and (4) calibrating the delivery zero position of each delivery connection rod after the spacecraft system grabs the space target or the de-orbit debris according to the above steps, thereby completing the center of mass adjustment after the spacecraft system grabs the space target or the de-orbit debris.

4. The spacecraft nutation inhibition method according to claim 1, wherein an attitude rotation change occurring in the spacecraft system is a pitch, yaw, or roll angle change.

5. The spacecraft nutation inhibition method according to claim 1, wherein one delivery connection rod is vertically rotatably arranged in the main connecting shaft, and in the step S3, the one delivery connection rod performs an energy storage accelerated rotation by a geomagnetic energy storage method.

6. The spacecraft nutation inhibition method according to claim 1, wherein two delivery connection rods are vertically rotatably arranged in the main connecting shaft, and in the step S3, the two delivery connection rods are driven by a contra-rotating transmission mechanism to perform a reverse energy storage accelerated rotation.

7. The spacecraft nutation inhibition method according to claim 4, wherein an adjustment step of the delivery connection rod that has delivered the space target or the de-orbit debris in the step S4 specifically involves with:

adjusting the positions of the two mass blocks on the delivery connection rod that has delivered the space target or the de-orbit debris, adjusting the center of mass of the delivery connection rod to the main connecting shaft, and enabling the moment of the inertia of the delivery connection rod rotating around the main connecting shaft to be equal to an instantaneous moment of the inertia after delivering the space target or the de-orbit debris.

8. The spacecraft nutation inhibition method according to claim 6, wherein an adjustment step of the delivery connection rod that has delivered the space target or the de-orbit debris in the step S4 specifically involves with:

(1) adjusting first positions of the two mass blocks on the delivery connection rod that has delivered a first space target or the de-orbit debris, adjusting the center of mass of the delivery connection rod to the main connecting shaft, and enabling the moment of the inertia of the delivery connection rod rotating around the main connecting shaft to be equal to an instantaneous moment of the inertia after delivering the first space target or the de-orbit debris;

(2) enabling a linear telescopic device to perform a stretch and retraction operation to adjust the center of mass of the spacecraft system to the delivery plane in which the delivery connection rod that is to deliver a second space target or the de-orbit debris rotates vertically around the main connecting shaft, and delivering the second space target or the de-orbit debris when the delivery requirement is satisfied; and (3) adjusting second positions of the two mass blocks on the delivery connection rod that has delivered the second space target or the de-orbit debris, adjusting the center of mass of the delivery connection rod to the main connecting shaft, and enabling the moment of the inertia of the delivery connection rod rotating around the main connecting shaft to be equal to an instantaneous moment of the inertia after delivering the second space target or the de-orbit debris.

9. The spacecraft nutation inhibition method according to claim 7, wherein the energy dissipation and unloading in the step S5 specifically involves with adopting a magnetic moment generated by an orthogonal strong magnetic moment generating device to reversely act on the moment of the inertia of the delivery connection rod which rotates continuously.

10. The spacecraft nutation inhibition method according to claim 8, wherein the energy dissipation and unloading in the step S5 specifically involves with adopting a magnetic moment generated by an orthogonal strong magnetic moment generating device to reversely act on a residual moment of the inertia of the two delivery connection rods that rotate continuously oppositely.

11. The spacecraft nutation inhibition method according to claim 2, wherein the attitude rotation change occurring in the spacecraft system is a pitch, yaw, or roll angle change.

12. The spacecraft nutation inhibition method according to claim 2, wherein one delivery connection rod is vertically rotatably arranged in the main connecting shaft, and in the step S3, the one delivery connection rod performs an energy storage accelerated rotation by a geomagnetic energy storage method.

13. The spacecraft nutation inhibition method according to claim 3, wherein one delivery connection rod is vertically rotatably arranged in the main connecting shaft, and in the step S3, the one delivery connection rod performs an energy storage accelerated rotation by a geomagnetic energy storage method.

14. The spacecraft nutation inhibition method according to claim 2, wherein two delivery connection rods are vertically rotatably arranged in the main connecting shaft, and in the step S3, the two delivery connection rods are driven by a contra-rotating transmission mechanism to perform a reverse energy storage accelerated rotation.

15. The spacecraft nutation inhibition method according to claim 3, wherein two delivery connection rods are vertically rotatably arranged in the main connecting shaft, and in the step S3, the two delivery connection rods are driven by a contra-rotating transmission mechanism to perform a reverse energy storage accelerated rotation.

* * * * *